(12) United States Patent
Soskind

(10) Patent No.: US 11,719,887 B2
(45) Date of Patent: Aug. 8, 2023

(54) SUB-WAVELENGTH STRUCTURES FOR WAVEGUIDE IN-COUPLING

(71) Applicant: Apple Inc., Cupertino, CA (US)

(72) Inventor: Yakov G. Soskind, Plainsboro, NJ (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/591,619

(22) Filed: Feb. 3, 2022

(65) Prior Publication Data

US 2022/0317380 A1 Oct. 6, 2022

Related U.S. Application Data

(60) Provisional application No. 63/171,100, filed on Apr. 6, 2021.

(51) Int. Cl.
*G02B 6/35* (2006.01)
(52) U.S. Cl.
CPC .................... *G02B 6/3522* (2013.01)
(58) Field of Classification Search
CPC .................................................... G02B 6/3522
See application file for complete search history.

(56) References Cited

U.S. PATENT DOCUMENTS

| | | | |
|---|---|---|---|
| 8,969,831 B2 | 3/2015 | Shapira et al. | |
| 10,481,317 B2 | 11/2019 | Peroz et al. | |
| 10,838,110 B2 | 11/2020 | Glik et al. | |
| 10,935,730 B1 * | 3/2021 | Lou | G02B 27/0172 |
| 2018/0120559 A1 | 5/2018 | Yeoh et al. | |
| 2021/0033867 A1 | 2/2021 | Luo et al. | |

FOREIGN PATENT DOCUMENTS

CN 103547956 B * 6/2016 ........... G02B 5/1809

* cited by examiner

*Primary Examiner* — Sung H Pak
(74) *Attorney, Agent, or Firm* — Kligler & Associates Patent Attorneys Ltd.

(57) ABSTRACT

An optical device includes a waveguide including a first medium, which is transparent and has a first index of refraction at a target wavelength and which has mutually-parallel first and second surfaces arranged so that light at the target wavelength propagates within the waveguide by internal reflection between the first and second surfaces. A coupling layer is disposed over the first surface of the waveguide and includes a second medium having a second index of refraction at the target wavelength, which is greater than the first index of refraction, and is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength.

18 Claims, 3 Drawing Sheets

SUB-WAVELENGTH STRUCTURES FOR WAVEGUIDE IN-COUPLING

CROSS-REFERENCE TO RELATED APPLICATION

This application claims the benefit of U.S. Provisional Patent Application 63/171,100, filed Apr. 6, 2021, which is incorporated herein by reference.

FIELD OF THE INVENTION

The present invention relates generally to optical components and systems, and particularly to devices and methods for coupling light into a waveguide.

BACKGROUND

A slab waveguide comprises a medium that is transparent in a certain wavelength range and has mutually-parallel planar surfaces arranged so that light at wavelengths within the range propagates within the waveguide by total internal reflection (TIR) between the planar surfaces. Slab waveguides are used in a variety of applications and are particularly useful as a thin, durable medium for light transmission and projection in portable and wearable devices. (The terms "light" and "optical radiation" are used in the present description and in the claims to refer to electromagnetic radiation in any of the visible, ultraviolet, and infrared regions of the spectrum.)

SUMMARY

Embodiments of the present invention that are described hereinbelow provide improved structures for coupling light into a waveguide, as well as methods and apparatus associated with such structures.

There is therefore provided, in accordance with an embodiment of the invention, an optical device, which includes a waveguide including a first medium, which is transparent and has a first index of refraction at a target wavelength and which has mutually-parallel first and second surfaces arranged so that light at the target wavelength propagates within the waveguide by internal reflection between the first and second surfaces. A coupling layer is disposed over the first surface of the waveguide and includes a second medium having a second index of refraction at the target wavelength, which is greater than the first index of refraction, and is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength.

In a disclosed embodiment, the deice includes a planar interface layer of the second medium, which is disposed between the array of cylinders and the first surface of the waveguide and has a layer thickness less than the target wavelength.

In some embodiments, the periodic array includes a matrix of unit cells, wherein each of the unit cells includes two or more of the cylinders in a predefined spatial relation, which is uniform over the unit cells. In a disclosed embodiment, the matrix includes rows and columns of the unit cells, arranged along mutually perpendicular row axes and column axes, and at least two of the cylinders in each of the unit cells are arranged along a cell axis, which is oriented diagonally relative to the row axes and column axes. In one embodiment, each of the unit cells contains exactly two of the cylinders.

Alternatively or additionally, the cylinders include first cylinders and second cylinders disposed in alternation in the periodic array, wherein the first cylinders have a first diameter, and the second cylinders have a second diameter, which is different from the first diameter.

In the disclosed embodiments, the heights, diameters, and periodicity of the cylinders and locations of the cylinders in the periodic array are chosen so that a collimated beam of light that is incident on the coupling layer is coupled into the waveguide with an efficiency of at least 90%. In some embodiments, the heights and diameters of the cylinders and the distance between each of the cylinders and the neighboring cylinder are all less than 1 μm. In an embodiment in which the target wavelength is less than 1 μm, the heights and diameters of the cylinders and the distance between each of the cylinders and the neighboring cylinder are all less than 0.7 μm.

There is also provided, in accordance with an embodiment of the invention, a method for producing an optical device. The method includes providing a waveguide including a first medium, which is transparent and has a first index of refraction at a target wavelength and which has mutually-parallel first and second surfaces arranged so that light at the target wavelength propagates within the waveguide by internal reflection between the first and second surfaces. A coupling layer including a second medium having a second index of refraction at the target wavelength, which is greater than the first index of refraction, is applied over the first surface of the waveguide. The coupling layer is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength.

There is additionally provided, in accordance with an embodiment of the invention, a method for coupling light, which includes directing a beam of light at a given wavelength toward a first surface of a waveguide including a first medium, which is transparent and has a first index of refraction at the given wavelength and which has mutually-parallel first and second surfaces arranged so that light at the given wavelength propagates within the waveguide by internal reflection between the first and second surfaces. The light is coupled from the beam into the waveguide using a coupling layer, which is disposed over the first surface of the waveguide and includes a second medium having a second index of refraction at the target wavelength, which is greater than the first index of refraction, and which is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength.

In a disclosed embodiment, coupling the light includes deflecting multiple diffraction orders of the beam into the waveguide using the periodic array of cylinders.

The present invention will be more fully understood from the following detailed description of the embodiments thereof, taken together with the drawings in which:

DETAILED DESCRIPTION OF EMBODIMENTS

Figure 1:
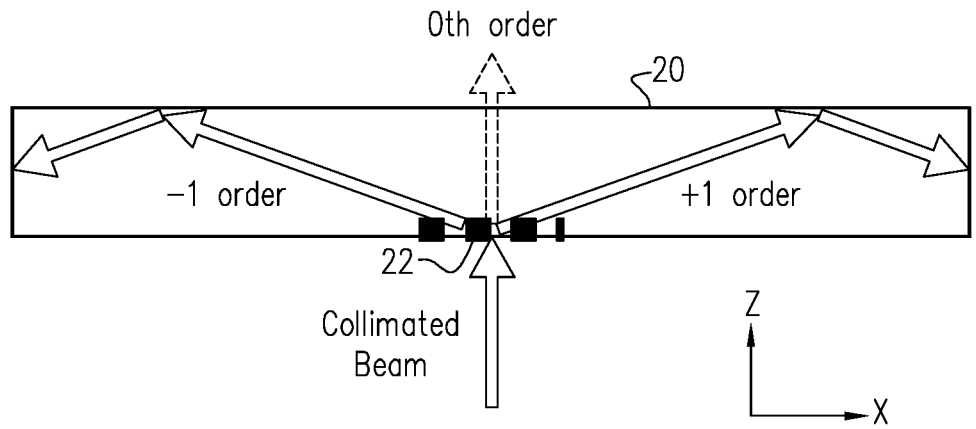
FIG. 1 is schematic sectional view of a waveguide showing coupling of a beam of light into the waveguide, in accordance with an embodiment of the invention.

Some applications require that light be injected into a slab waveguide at a high angle relative to the surface of the slab (i.e., at an angle greater than the critical angle for TIR within the waveguide, which is measured relative to a normal to the surface). For this purpose, a coupling element is used to deflect the light into guided modes that will propagate within the waveguide at reflection angles above the critical angle. For example, refractive prisms placed in optical contact with the waveguide medium can be used to couple high-angle light efficiently into the waveguide. This sort of scheme, however, increases the overall size of the waveguide module and may not be acceptable in applications with strict dimensional constraints.

Surface-relief gratings on the surface of the waveguide can be used for similar purposes without increasing the waveguide dimensions. The coupling efficiency in this case typically depends on the fraction of the incident light that is diffracted into the first diffraction order of the grating. This fraction is a function of the material properties and the geometry of the surface relief features of the grating. The grating may be blazed at an angle to increase coupling efficiency, but this sort of blazing requires a complex, high-precision manufacturing process. Even when blazed gratings are used, a large fraction of the optical energy is lost to the zero-order mode, as well as to other diffraction modes and scatter.

There is thus a need for new techniques and structures for coupling light into a waveguide that are as compact as conventional diffraction gratings but have the high efficiency of prism couplers. Embodiments of the present invention satisfy this need by adopting a different approach, in which the in-coupling structure deflects multiple diffraction orders into respective guided modes within the waveguide. By appropriate choice of the design parameters of the in-coupling structure, a large fraction of the incident light can be coupled into the waveguide. The designs described herein are simple to fabricate and have reduced polarization dependence relative to conventional gratings.

In the disclosed embodiments, a coupling layer is disposed over one of the planar surfaces of a waveguide, which is transparent at a certain target wavelength. The coupling layer comprises a medium having an index of refraction at the target wavelength that is greater than the index of refraction of the waveguide medium. The coupling layer is patterned to define an in-coupling structure made up of a periodic array of cylinders, with respective cylinder axes perpendicular to the surface of the waveguide. The cylinders have respective heights and diameters that are smaller than the target wavelength and are spaced apart such that the distance between each of the cylinders and a neighboring cylinder in the array is less than the target wavelength. By appropriate choice of the dimensions and spacing of the cylinders, this sort of coupling structure can be made to diffract the incident beam into multiple guided modes in the waveguide with coupling efficiencies in excess of 90%.

In the embodiments that are described below, the cylinders are arranged in a matrix of unit cells. Each cell contains two or more of the cylinders in a predefined spatial relation, which is uniform over the unit cells. To provide the desired multi-order diffraction into the waveguide, at least two of the cylinders in each of the unit cells are arranged along a cell axis that is oriented diagonally relative to the row and column axes of the matrix of unit cells. For example, each of the unit cells may contain exactly two cylinders along a diagonal cell axis. Alternatively or additionally, the array make comprise cylinders of different diameters, which are disposed in alternation in the periodic array.

Coupling structures in accordance with the present embodiments can be manufactured using techniques of thin-film deposition and photolithography that are known in the art. In particular, because the axes of the cylinders are normal to the surface of the waveguide, the cylinders can be formed by traditional etching techniques, in contrast, for example, to the slanted geometries and deep etch requirements of blazed diffraction gratings. On the other hand, the dimensions of the present coupling structures are large enough so that the structures can be produced with high yields using existing photolithographic equipment and design rules.

FIG. 1 is schematic sectional view of a waveguide 20, with a coupling structure 22 for coupling a beam of light into the waveguide, in accordance with an embodiment of the invention. The light beam is assumed to be a monochromatic, coherent plane wave at a certain target wavelength with arbitrary polarization, at normal incidence with respect to the waveguide surface. Alternatively, coupling structure 22 will also be effective (possibly with reduced efficiency) in coupling other sorts of beams at different angles into waveguide 20. In the examples shown in the tables below, the wavelength is taken to be 940 nm, but the principles of these embodiments may be adapted simply for shorter or longer target wavelengths.

Waveguide 20 comprises a medium that is transparent at the target wavelength and has mutually-parallel upper and lower surfaces, which are assumed for the sake of clarity to be oriented parallel to the X-Y plane. (The directions of the coordinate axes and the terms "upper" and "lower" are used here arbitrarily for the sake of clarity in reference to the figures; and waveguide 20 may be mounted and operate in any desired orientation.) In the examples that are detailed below, waveguide 20 is assumed to comprise fused silica, but the waveguide may alternatively comprise any other suitable glass, polymer, or crystalline material. After injection into waveguide 20, light at the target wavelength propagates within the waveguide by internal reflection between the upper and lower surfaces.

In the present example, the input light beam is incident on waveguide 20 along the Z-axis, i.e., in a direction normal to the surface of the waveguide. Coupling structure 22 on the surface of waveguide 20 divides the incident beam into multiple diffraction orders, such as the +1 and −1 orders shown in FIG. 1, which couple into corresponding guided modes within the waveguide. Coupling structure 22 is made from a coupling layer, which is disposed over the lower surface of waveguide 20 and comprises a medium having an index of refraction at the target wavelength that is greater than the index of refraction of the waveguide medium. In the examples shown in FIGS. 2A-C and 3, the coupling layer is assumed to comprise silicon nitride ($Si_3N_4$), but other suitable high-index materials may alternatively be used, such as amorphous or polycrystalline silicon.

As noted earlier, the coupling layer is patterned to define coupling structure 22 as a periodic array of cylinders, with dimensions and spacing between neighboring cylinders that are all less than the target wavelength. By proper choice of the material and dimensions, coupling structure 22 will couple the incident collimated beam into waveguide 20 with an efficiency greater than 90%. In the disclosed embodiments, the heights and diameters of the cylinders and the distance between each of the cylinders and the neighboring cylinder are all less than 1 μm, and they may be less than 0.7 μm or even smaller, depending on the target wavelength.

Some representative examples of coupling structures that have these sorts of characteristics and achieve this sort of high coupling efficiency are shown in the figures that follow, with dimensions listed in the corresponding table below. Alternative designs of coupling structures based on cylinder arrays will be apparent to those skilled in the art after reading the present description and are also considered to be within the scope of the present invention.

Figure 2A:
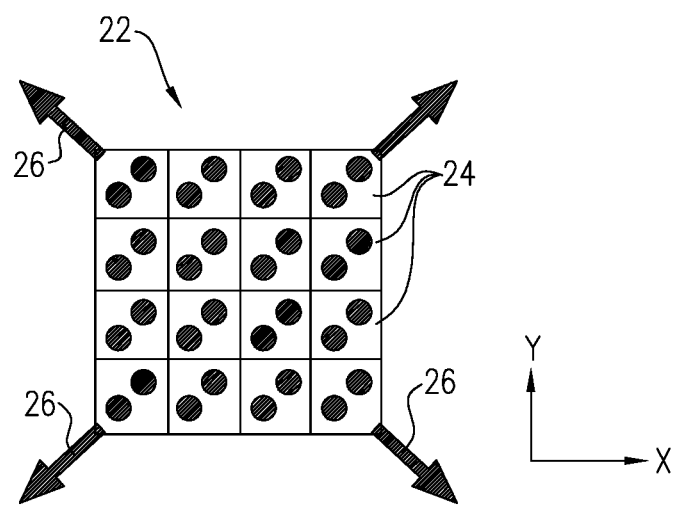
FIG. 2A is a schematic frontal view of a coupling structure for coupling light into a waveguide, in accordance with an embodiment of the invention.
Figure 2B:
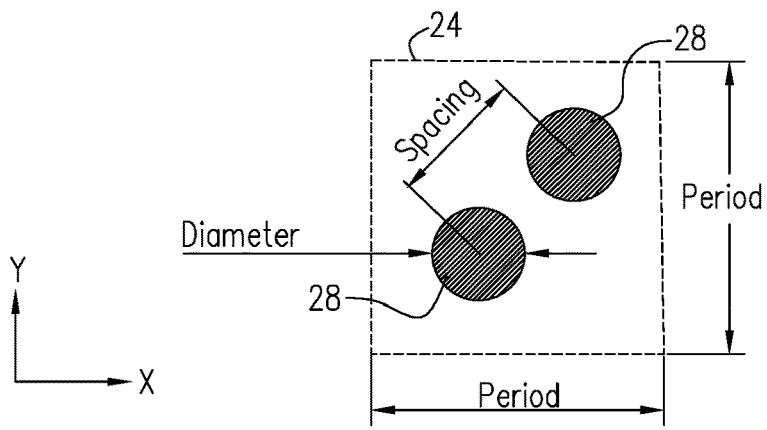
FIG. 2B is a schematic detail view of a unit cell in the coupling structure of FIG. 2A.
Figure 2C:
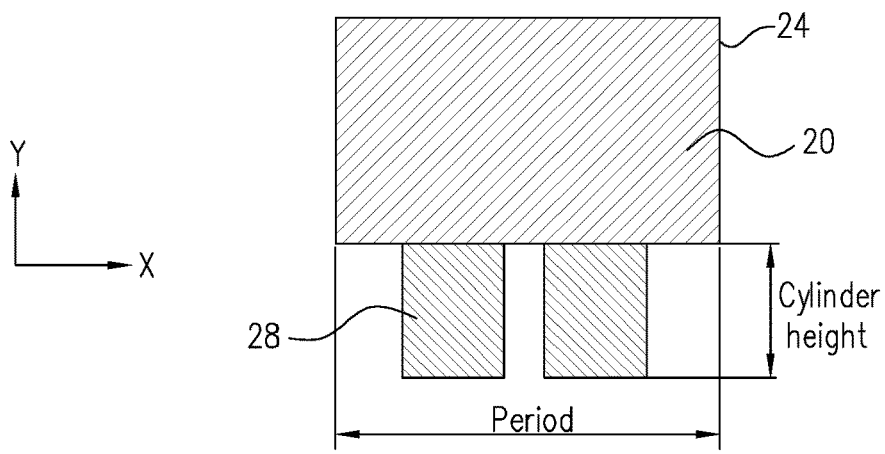
FIG. 2C is a schematic side view of the unit cell of FIG. 2B.

Reference is now made to FIGS. 2A-C, which schematically illustrate coupling structure 22, in accordance with an embodiment of the invention. FIG. 2A is a frontal view of the coupling structure, while FIGS. 2B and 2C show detail and side views, respectively, of a unit cell 24 in coupling structure 22.

Coupling structure 22 comprises a matrix of unit cells 24, each containing two cylinders 28 in a predefined spatial relation, which is uniform over the unit cells. Specifically, assuming the rows and columns of the unit cells to be oriented along the X- and Y-axes, cylinders 28 in each unit cell 24 are arranged along a cell axis, which is oriented diagonally relative to the X- and Y-axes. The cylinder axes of cylinders 28 extend along the Z-direction, perpendicular to the surface of waveguide 20.

The pictured arrangement has the effect of dividing the incident beam of light into four diffraction orders 26, which can be referred to as the (+1,+1), (+1,−1), (−1,−1), and (−1,+1) orders, all of which are diffracted into waveguide 20 at angles above the critical angle for TIR in the waveguide. At least 90% of the energy in the incident beam is coupled into these orders, with the remainder lost, for example, by transmission through the waveguide in the zero-order mode and reflection from the lower surface of the waveguide.

The dimensions of coupling structure 22 are marked in FIGS. 2B and 2C, and include the period of the matrix of unit cells 24, the diameters and heights of cylinders 28, and the spacing between each cylinder and its immediate neighbor in its unit cell. (As shown in FIG. 2B, the term "spacing" refers to the center-to-center distance between the cylinders.) Table I lists example values of these dimensions, assuming (as noted above) that waveguide 20 comprises fused silica, coupling structure 22 comprises $Si_3N_4$, and the target wavelength is 940 nm:

TABLE I

| FIRST EMBODIMENT | |
| --- | --- |
| Period (μm) | 1.260 |
| Cylinder height (μm) | 0.592 |
| Cylinder diameter (μm) | 0.497 |
| Spacing (μm) | 0.891 |

Under these conditions, numerical simulations show that coupling structure 22 will achieve an efficiency of 98% in coupling light from the input beam into waveguide 20, irrespective of polarization. Only 1.4% of the incident energy is transmitted through the waveguide in the zero-order mode, while 0.6% is reflected. (These are calculated figures, and the actual efficiency may be lower, due to factors such as material quality and manufacturing tolerances, for example.)

Figure 3:
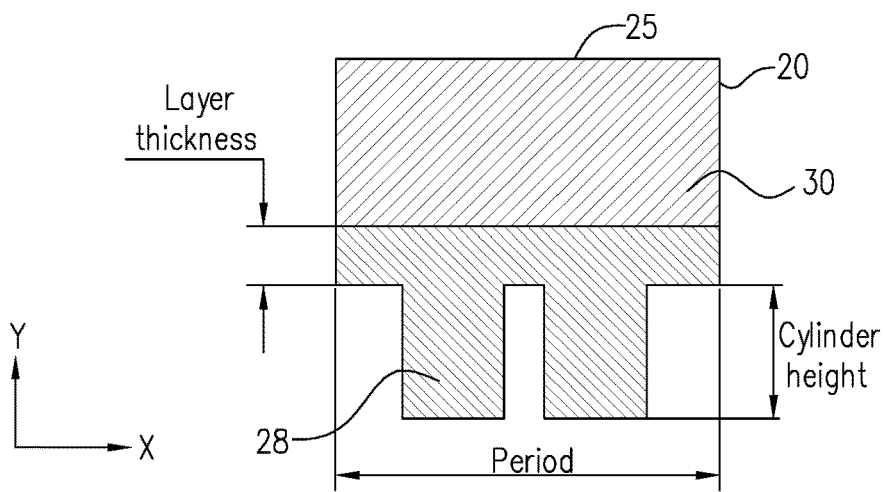
FIG. 3 is a schematic side view of a unit cell in a coupling structure for coupling light into a waveguide, in accordance with another embodiment of the invention.

FIG. 3 is a schematic side view of a unit cell 25 in a coupling structure for coupling light into a waveguide, in accordance with another embodiment of the invention. Unit cell 25 may be substituted for unit cell 24, for example, in coupling structure 22 (as shown in FIG. 2A). Unit cell 25 differs from unit cell 24 in that it comprises a planar interface layer 30 of the coupling medium, which is disposed between cylinders 28 and the lower surface of waveguide 20. The thickness of layer 30 is less than the target wavelength (typically much less than the target wavelength).

Table II lists example values of the dimensions of unit cell 25, under the same assumptions as were set forth above with respect to Table I:

TABLE II

| SECOND EMBODIMENT | |
| --- | --- |
| Period (μm) | 1.260 |
| Layer thickness (μm) | 0.050 |
| Cylinder height (μm) | 0.542 |
| Cylinder diameter (μm) | 0.497 |
| Spacing (μm) | 0.891 |

A coupling structure made up of unit cells 25 with these dimensions will achieve a coupling efficiency of 99.4%, irrespective of polarization, with reduced reflection and zero order transmission losses.

Figure 4A:
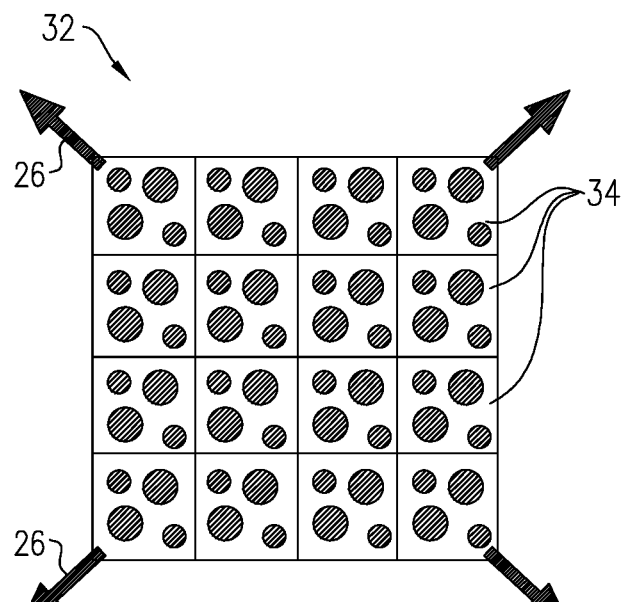
FIG. 4A is a schematic frontal view of a coupling structure for coupling light into a waveguide, in accordance with an alternative embodiment of the invention.
Figure 4B:
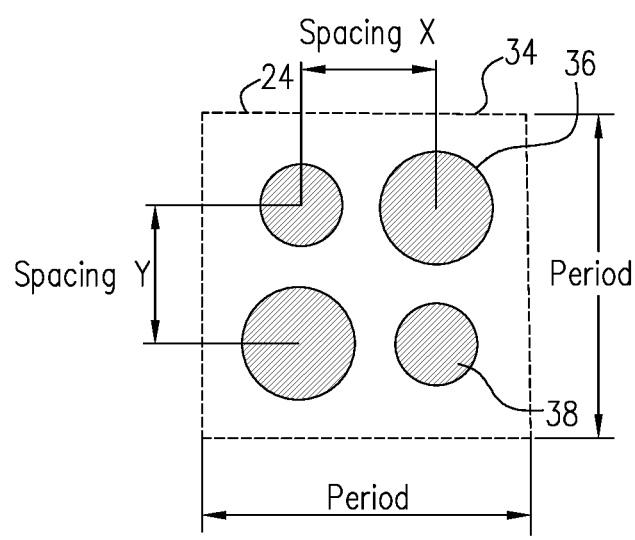
FIG. 4B is a schematic detail view of a unit cell in the coupling structure of FIG. 4A.

Reference is now made to FIGS. 4A and 4B, which schematically illustrate a coupling structure 32 for coupling light into waveguide 20, in accordance with an alternative embodiment of the invention. FIG. 4A is a frontal view of coupling structure 32, while FIG. 4B is a detail view of a unit cell 34 in coupling structure 32. The matrix of unit cells 34 contains large-diameter cylinders 36 and small-diameter cylinders 38, which are disposed in alternation in a periodic array. Here, too, cylinders 36 and 38 define diagonal cell axes, for diffracting the incident light into multiple orders. The heights and diameters of cylinders 36 and 38 and the spacing between the cylinders and their nearest neighbors are all less than the target wavelength.

Table III lists example values of these dimensions, assuming that waveguide 20 comprises fused silica, coupling structure 32 comprises amorphous silicon, and the target wavelength is 940 nm. The coupling structure is assumed to comprise a planar interface layer of amorphous silicon, similar to layer 30 in FIG. 3.

TABLE III

| THIRD EMBODIMENT | |
| --- | --- |
| Period (μm) | 1.260 |
| Layer thickness (μm) | 0.037 |
| Cylinder height (μm) | 0.529 |
| Cylinder diameter 1 (μm) | 0.238 |
| Cylinder diameter 2 (μm) | 0.192 |
| Spacing (μm) | 0.630 |

Coupling structure 32 with these dimensions will achieve a coupling efficiency of 95.25%, irrespective of polarization.

Although a number of specific designs have been described and shown above for the sake of illustration, alternative designs of coupling structures based on the principles of the disclosed embodiments will be apparent to those skilled in the art after reading the present description and are considered to be within the scope of the present invention. Such alternative designs may include, for example, different sizes and arrangements of the cylinders within the unit cells of the coupling structures. Furthermore, the cylinders themselves may have elliptical cross-sections, rather than circular cross-sections as in the pictured embodiments.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
a waveguide comprising a first medium, which is transparent and has a first index of refraction at a target wavelength and which has mutually-parallel first and second surfaces arranged so that light at the target wavelength propagates within the waveguide by internal reflection between the first and second surfaces; and
a coupling layer, which is disposed over the first surface of the waveguide and comprises a second medium having a second index of refraction at the target wavelength, which is greater than the first index of refraction, and which is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength,
wherein the periodic array comprises a matrix of unit cells, wherein each of the unit cells comprises two or more of the cylinders in a predefined spatial relation, which is uniform over the unit cells.

2. The device according to claim 1, and comprising a planar interface layer of the second medium, which is disposed between the array of cylinders and the first surface of the waveguide and has a layer thickness less than the target wavelength.

3. The device according to claim 1, wherein the matrix comprises rows and columns of the unit cells, arranged along mutually perpendicular row axes and column axes, and wherein at least two of the cylinders in each of the unit cells are arranged along a cell axis, which is oriented diagonally relative to the row axes and column axes.

4. The device according to claim 3, wherein each of the unit cells contains exactly two of the cylinders.

5. The device according to claim 1, wherein the cylinders comprise first cylinders and second cylinders disposed in alternation in the periodic array, wherein the first cylinders have a first diameter, and the second cylinders have a second diameter, which is different from the first diameter.

6. The device according to claim 1, wherein the heights, diameters, and periodicity of the cylinders and locations of the cylinders in the periodic array are chosen so that a collimated beam of light that is incident on the coupling layer is coupled into the waveguide with an efficiency of at least 90%.

7. The device according to claim 1, wherein the heights and diameters of the cylinders and the distance between each of the cylinders and the neighboring cylinder are all less than 1 μm.

8. The device according to claim 7, wherein the target wavelength is less than 1 μm, and the heights and diameters of the cylinders and the distance between each of the cylinders and the neighboring cylinder are all less than 0.7 μm.

9. A method for producing an optical device, the method comprising:
providing a waveguide comprising a first medium, which is transparent and has a first index of refraction at a target wavelength and which has mutually-parallel first and second surfaces arranged so that light at the target wavelength propagates within the waveguide by internal reflection between the first and second surfaces; and
applying over the first surface of the waveguide a coupling layer comprising a second medium having a second index of refraction at the target wavelength, which is greater than the first index of refraction; and
patterning the coupling layer to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength,
wherein the periodic array comprises a matrix of unit cells, wherein each of the unit cells comprises two or more of the cylinders in a predefined spatial relation, which is uniform over the unit cells.

10. The method according to claim 9, wherein applying the coupling layer comprises forming a planar interface layer of the second medium, having a layer thickness less than the target wavelength, between the array of cylinders and the first surface of the waveguide.

11. The method according to claim 9, wherein the matrix comprises rows and columns of the unit cells, arranged along mutually perpendicular row axes and column axes, and wherein at least two of the cylinders in each of the unit cells are arranged along a cell axis, which is oriented diagonally relative to the row axes and column axes.

12. The method according to claim 11, wherein each of the unit cells contains exactly two of the cylinders.

13. The method according to claim 9, wherein patterning the coupling layer comprises forming first cylinders and second cylinders disposed in alternation in the periodic array, wherein the first cylinders have a first diameter, and the second cylinders have a second diameter, which is different from the first diameter.

14. The method according to claim 9, wherein the heights, diameters, and periodicity of the cylinders and locations of the cylinders in the periodic array are chosen so that a collimated beam of light that is incident on the coupling layer is coupled into the waveguide with an efficiency of at least 90%.

15. The method according to claim 9, wherein the heights and diameters of the cylinders and the distance between each of the cylinders and the neighboring cylinder are all less than 1 µm.

16. The method according to claim 15, wherein the target wavelength is less than 1 µm, and the heights and diameters of the cylinders and the distance between each of the cylinders and the neighboring cylinder are all less than 0.7 µm.

17. A method for coupling light, comprising:
  directing a beam of light at a target wavelength toward a first surface of a waveguide comprising a first medium, which is transparent and has a first index of refraction at the target wavelength and which has mutually-parallel first and second surfaces arranged so that light at the target wavelength propagates within the waveguide by internal reflection between the first and second surfaces; and
  coupling the light from the beam into the waveguide using a coupling layer, which is disposed over the first surface of the waveguide and comprises a second medium having a second index of refraction at the target wavelength, which is greater than the first index of refraction, and which is patterned to define a periodic array of cylinders, which have respective cylinder axes perpendicular to the first surface and have respective heights and diameters that are smaller than the target wavelength, and which are spaced apart such that a distance between each of the cylinders and a neighboring cylinder in the array is less than the target wavelength,
  wherein the periodic array comprises a matrix of unit cells, wherein each of the unit cells comprises two or more of the cylinders in a predefined spatial relation, which is uniform over the unit cells.

18. The method according to claim 17, wherein coupling the light comprises deflecting multiple diffraction orders of the beam into the waveguide using the periodic array of cylinders.

* * * * *